United States Patent
Ranjan et al.

(10) Patent No.: US 9,575,965 B2
(45) Date of Patent: Feb. 21, 2017

(54) TRANSLATION ASSESSMENT BASED ON COMPUTER-GENERATED SUBJECTIVE TRANSLATION QUALITY SCORE

(71) Applicants: Rajesh Ranjan, Pune (IN); Ankitkumar Patel, Maharashtra (IN)

(72) Inventors: Rajesh Ranjan, Pune (IN); Ankitkumar Patel, Maharashtra (IN)

(73) Assignee: Red Hat, Inc., Raleigh, NC (US)

( * ) Notice: Subject to any disclaimer, the term of this patent is extended or adjusted under 35 U.S.C. 154(b) by 312 days.

(21) Appl. No.: 13/802,449

(22) Filed: Mar. 13, 2013

(65) Prior Publication Data
US 2014/0278341 A1 Sep. 18, 2014

(51) Int. Cl.
*G06F 17/28* (2006.01)
*G06F 17/27* (2006.01)

(52) U.S. Cl.
CPC ......... *G06F 17/2854* (2013.01); *G06F 17/271* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 5,873,055 | A * | 2/1999 | Okunishi | G06F 17/271 704/2 |
| 2005/0197827 | A1* | 9/2005 | Ross et al. | 704/2 |
| 2006/0100858 | A1* | 5/2006 | McEntee et al. | 704/10 |
| 2006/0129381 | A1* | 6/2006 | Wakita | G06F 17/2872 704/9 |
| 2007/0050182 | A1* | 3/2007 | Sneddon et al. | 704/2 |
| 2011/0077934 | A1* | 3/2011 | Kanevsky | G06F 17/289 704/3 |
| 2011/0248914 | A1* | 10/2011 | Sherr | 345/156 |

* cited by examiner

*Primary Examiner* — Qian Yang
(74) *Attorney, Agent, or Firm* — Lowenstein Sandler LLP (57) ABSTRACT

A system and method for assessing translation quality are disclosed. In one example, a computer system receives data associated with a translation from a first text in a first natural language to a second text in a second natural language, wherein the data comprises a first value that is based on one or more semantic errors of the second text, a second value that is based on extraneous content in the second text, and a third value that is based on missing content in the second text; and determining by the computer system, based on the first value, the second value, and the third value, a score that quantifies translation quality of the second text with respect to the first text.

11 Claims, 5 Drawing Sheets

TRANSLATION ASSESSMENT BASED ON COMPUTER-GENERATED SUBJECTIVE TRANSLATION QUALITY SCORE

TECHNICAL FIELD

This disclosure relates to computer systems, and more particularly, to assessing the quality of translations.

BACKGROUND

Translation is the communication of the meaning of a source-language text by means of an equivalent target-language text. Translation began only after the appearance of written literature; there exist partial translations of the Sumerian Epic of Gilgamesh (ca. 2000 BCE) into Southwest Asian languages of the second millennium BCE.

As is apparent to anyone who has read a translation from a source natural language (e.g., English, Spanish, etc.) into a destination natural language, it is very difficult, even for multi-lingual humans, to produce a translation that is faithful in meaning to the original source text. Computer-generated translations typically fall short of those produced by skilled humans, as evidenced by the fact that text translated from one language to another by a computer, and then translated back to the original language by the computer, often differs greatly in meaning from the original text. A well-known example from the early days of computer-based translation is a translation of the English sentence "The spirit is willing, but the flesh is weak" into Russian, and then back from Russian to English, with the result in English being "The vodka is good, but the meat is rotten." Another well-known example illustrating the difficulties of translation is the English sentence "Time flies like an arrow, but fruit flies like a banana."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for assessing the quality of a translation from one natural language (e.g., English, Spanish, etc.) to another natural language. In accordance with one embodiment, four categories are defined to assess translation quality: semantic quality, syntactic quality, stylistic quality, and formatting quality. Semantic quality is concerned with issues such as:

how faithfully the translation captures the meaning of the original text;

the presence and quantity of extraneous content in the translation;

content in the original text that is missing in the translation; and how closely the cultural context of the translation matches that of the original text.

An example of the first issue is a translation of the sentence "The white dishwasher is a Kenmore" that semantically interprets "white dishwasher" incorrectly as a Caucasian person who washes dishes, rather than a dishwashing machine that is white in color. An example of the second issue is a translation of the English sentence "Barack Obama is in San Jose today" to a foreign-language equivalent of the English sentence "U.S. President Barack Obama left Washington D.C. today for San Jose, Calif.," which is unnecessarily verbose. An example of the third issue is a translation of the English sentence "I saw Steven Spielberg at the premiere of 'Lincoln' in L.A." to a foreign-language equivalent of the English sentence "I saw Steven Spielberg's movie 'Lincoln' when I was in L.A." An example of the fourth issue is a first translation of the French sentence "J'aime le football" into "I like football" in the London Times and a second translation into "I like soccer" in the New York Times.

Syntactic quality is concerned with issues such as grammar, spelling, punctuation, usage of plural forms, tags, equations, and so forth. Stylistic quality is concerned with issues such as abbreviations and acronyms, capitalization, usage of appropriate examples and idioms, unity, readability, and so forth. Formatting quality is concerned with issues such as headers, footers, numbers, cross-references, fonts, white space, string length, and so forth.

In accordance with one example, translation quality is assessed by determining the number of errors in each category, as well as the severity of the errors, and computing an overall translation quality score based on a weighted sum of the error counts. In another example, a classifier is trained on a set of examples, each of which is an input-output pair, where the input comprises a feature vector that is based on the original text and the translated text, and the output comprises a subjective translation quality score that is provided by a user. The trained classifier is then used to assess the quality of a particular translation by extracting features from the original text and translated text (e.g., word frequency, occurrence of word pairs, average sentence length, etc.), generating a feature vector based on the features, and providing the feature vector to the trained classifier to obtain an overall translation quality score.

In some examples, the errors are determined by one or more linguistic analysis programs (e.g., a parser to determine grammatical errors, a semantic interpreter to determine semantic errors, etc.), while in some other examples errors associated with a particular category (e.g., semantic, syntactic, formatting, etc.) are estimated by a classifier for that category (e.g., a semantic error classifier that is trained on input-output pairs mapping text to a semantic error count, a syntactic error classifier that is trained on input-output pairs mapping text to a syntactic error count, etc.), while in yet other examples errors may be determined by a user.

In one embodiment, the quality of the translated text (or "target text") is assessed in accordance with the following criteria:

target text should be faithful to the contextual meaning of the source text;

target text should not have any additional or missing content unless it is required to understand the context and meaning of translation;

headers, footers, numbers and cross-references should match with the source text;

target text should use correct, popular, contemporary and well accepted conventions of the target language grammar;

target text should not contain any spelling errors or typos and should follow correct, popular, contemporary and well accepted conventions of writing words;

target text should follow the appropriate convention of capitalization in the target language;

target text should follow the punctuation rules of the target language;

target text should contain language use related to the particular domain or social setting of the audience of the target text;

target text should not contain any other language related errors;

tag, syntax, equations, and arguments should be intact in the target text;

target text should use appropriate accelerators as per the convention of language and community;

target text should place white-space as per the rule and convention of the target language;

target text should use correct plural forms;

target text should be keyed in appropriate fonts either suggested by the clients or required for the end product;

target text should not go beyond the prescribed string length;

target text should address the cultural context appropriately;

target text should present the country related locale data correctly;

target text should contain and follow the language specific data in the present locale;

target text should contain examples, idioms, etc. according to audience;

target text should follow the style guide if available and if not available, the translation should follow the popular style of the translation present in that domain;

target text should have a high degree of internal unity and readability;

target text should or should not use dialects of the target language as per the guidelines or audience;

target text should contain the glossaries and terminology prescribed or in case of glossary unavailability target text should contains words and terms from popular convention of the target language and related specialization;

target text should not contain inconsistent terms or words;

target text should contain abbreviation and acronyms according to convention of the target language.

Embodiments of the present disclosure thus provide a mechanism by which the quality of a translation can be assessed in a quantitative fashion. The translation assessment can be applied to translations performed by humans, as well as to translations performed by a computer. By assessing multiple translations performed by the same person (or the same computer program) in this fashion, the translation skill of the person (or computer program) can be automatically evaluated and compared to other persons or computer programs.

Figure 1:
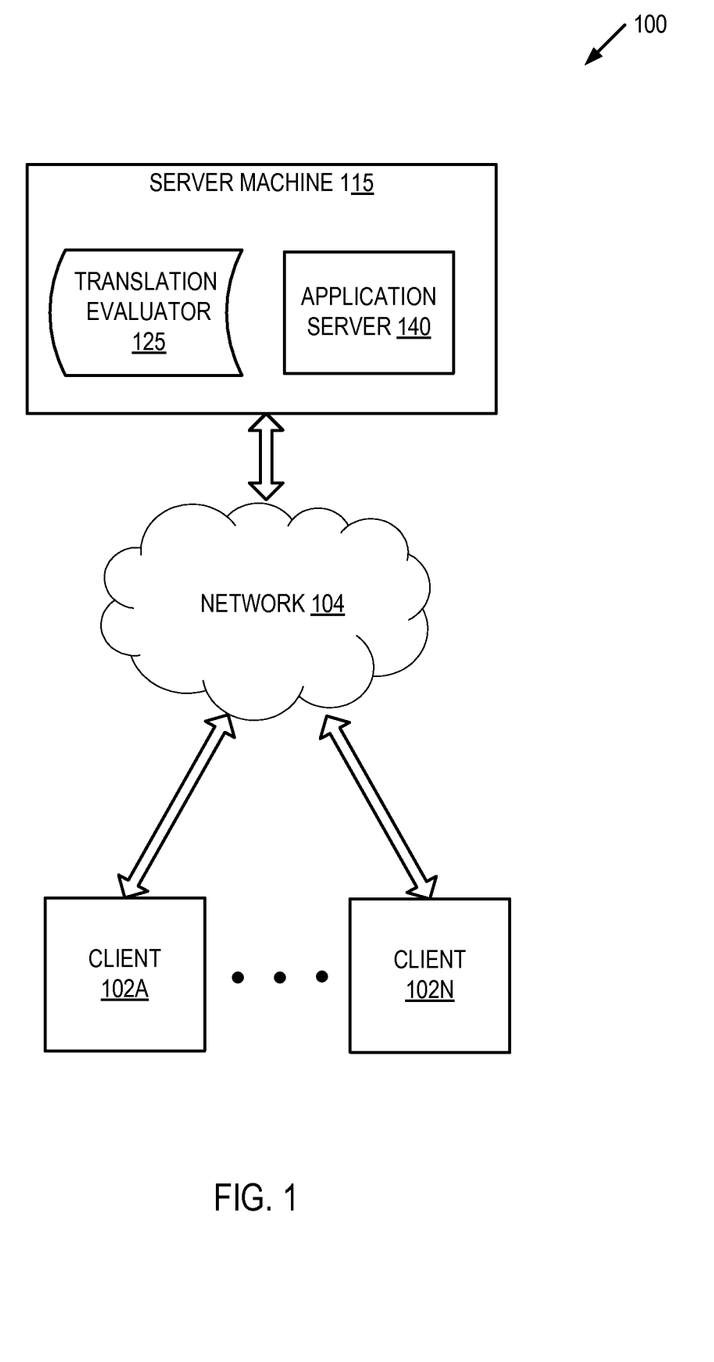
FIG. 1 depicts an exemplary system architecture, in accordance with an embodiment of the present invention.

FIG. 1 depicts an exemplary system architecture 100, in accordance with an embodiment of the present invention. The system architecture 100 includes a server machine 115 and client machines 102A-102N connected via a network 104. The client machines 102A-102N may be personal computers (PC), laptops, mobile phones, tablet computers, or any other computing devices. The client machines 102A-102N may run an operating system (OS) that manages hardware and software of the client machines 102A-102N, and a browser that can access web pages of a web server and web pages of a web-based application served by an application server. Network 104 may be a public network (e.g., the Internet), a private network (e.g., a local area network (LAN) or wide area network (WAN)), or a combination thereof.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes an application server 140 and a translation evaluator 125. In alternative embodiments, the application server 140 and translation evaluator 125 may run on different machines.

Application server 140 hosts a software application that receives text and translations of text from clients 102A-102N (e.g., text documents that are uploaded by clients 102A-102N via a Web-based graphical interface, etc.), provides the text and translations to translation evaluator 125, and that provides results from translation evaluator 125 to clients 102A-102N (e.g., via Web pages, via summary reports that can be downloaded from server machine 115 by clients 102A-102N, etc.). Translation evaluator 125 processes original and translated text and provides assessments of the quality of the translated text (e.g., a score that indicates how faithfully the translated text corresponds to the original text, etc.). An embodiment of translation evaluator 125 is described in detail below and with respect to FIGS. 2 through 4.

Figure 2:
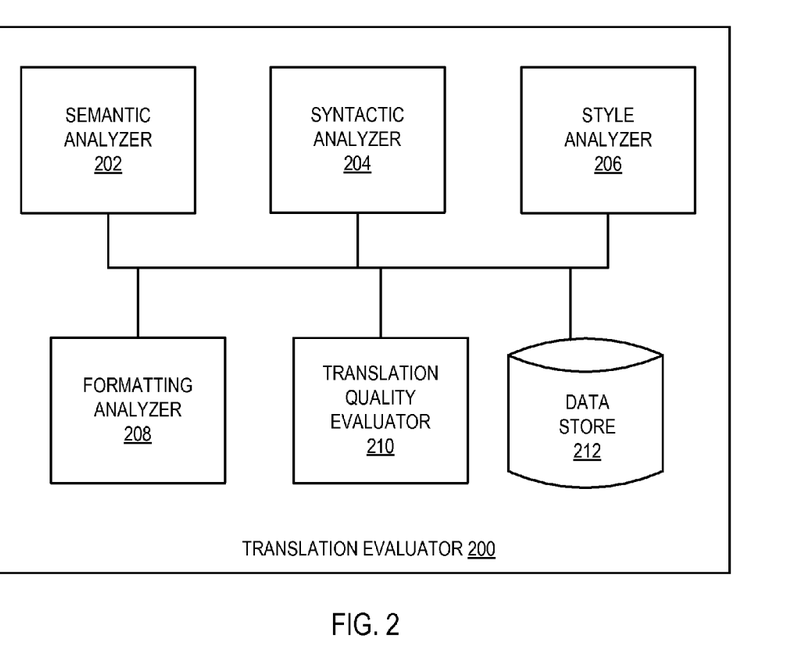
FIG. 2 depicts a block diagram of one embodiment of a translation evaluator.

FIG. 2 is a block diagram of one embodiment of a translation evaluator 200. The translation evaluator 200 may be the same as the translation evaluator 125 of FIG. 1 and may include a semantic analyzer 202, a syntactic analyzer 204, a style analyzer 206, an formatting analyzer 208, a translation quality evaluator 210, and a data store 212.

The data store 212 may be a temporary buffer or a permanent data store to hold source text, translated text, error counts, feature values, feature vectors, translation quality scores, and so forth. Alternatively, data store 212 may be hosted by one or more storage devices, such as main memory, magnetic or optical storage based disks, tapes or hard drives, NAS, SAN, and so forth.

The semantic analyzer 202 determines one or more semantic-related values associated with an original text and a translation of the original text, such as the number of errors in meaning in the translation as compared to the original text, the number of errors in contextual context in the translation as compared to the original text, extraneous text in the translation, missing content in the translation, semantic features of the original text and the translation (e.g., the presence and frequency of various semantic entities (people, places, activities, etc.) in the original text and the translation, etc.), and so forth. In one embodiment, the one or more semantic-related values are determined by a classifier that has been trained on mappings between a vector of semantic features and corresponding semantic-related values. Some operations of semantic analyzer 202 are described in more detail below with respect to FIGS. 3 and 4.

The syntactic analyzer 204 determines one or more syntactic-related values associated with an original text and a translation of the original text, such as the number of grammatical errors in the translation as compared to the original text, the number of spelling errors in the translation as compared to the original text, syntactic features of the original text and the translation (e.g., the presence and frequency of various syntactic entities (particular noun phrases, particular verb phrases, particular adjective phrases, etc.) in the original text and the translation, etc.), and so forth. In one embodiment, the one or more syntactic-related values are determined by a classifier that has been trained on mappings between a vector of syntactic features and corresponding syntactic-related values. Some operations of syntactic analyzer 204 are described in more detail below with respect to FIGS. 3 and 4.

The style analyzer 206 determines one or more stylistic-related values associated with an original text and a translation of the original text, such as the number of abbreviation errors in the translation as compared to the original text, the number of capitalization errors in the translation as compared to the original text, stylistic features of the original text and the translation (e.g., the presence and frequency of various stylistic-related entities (particular abbreviations, particular acronyms, particular idioms, etc.) in the original text and the translation, etc.), and so forth. In one embodiment, the one or more stylistic-related values are determined by a classifier that has been trained on mappings between a vector of stylistic features and corresponding stylistic-related values. Some operations of stylistic analyzer 206 are described in more detail below with respect to FIGS. 3 and 4.

The formatting analyzer 208 determines one or more formatting-related values associated with an original text and a translation of the original text, such as the number of errors in usage of headers and footers in the translation as compared to the original text, the number of errors in usage of white space in the translation as compared to the original text, formatting features of the original text and the translation (e.g., the presence, positioning, type, and size of various formatting-related entities (e.g., headers and footers, fonts, white space, etc.) in the translation as compared to the original text, etc.), and so forth. In one embodiment, the one or more formatting-related values are determined by a classifier that has been trained on mappings between a vector of formatting features and corresponding formatting-related values. Some operations of formatting analyzer 208 are described in more detail below with respect to FIGS. 3 and 4.

The translation quality evaluator 210 determines an overall translation quality score for a translation based on semantic, syntactic, stylistic and formatting values. In one example, the overall translation quality score is calculated as a function of the semantic, syntactic, stylistic and formatting values, while in another example, a trained classifier is employed to determine the overall translation quality score. Some operations of translation quality evaluator 210 are described in more detail below with respect to FIGS. 3 and 4.

Figure 3:
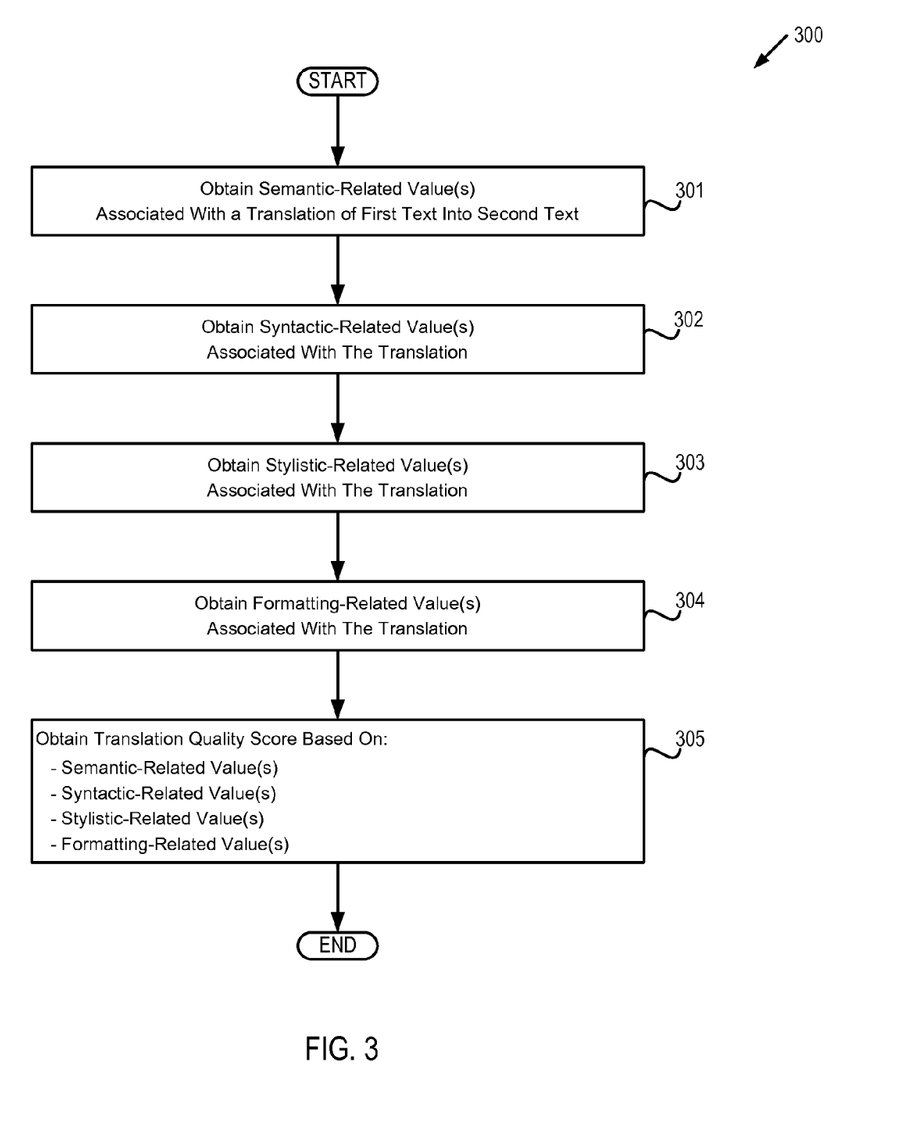
FIG. 3 depicts a flow diagram of one embodiment of a first method for evaluating the quality of a translation.

FIG. 3 depicts a flow diagram of one embodiment of a method 300 for evaluating the quality of a translation from a first text in a first natural language to a second text in a second natural language. The method is performed by processing logic that may comprise hardware (circuitry, dedicated logic, etc.), software (such as is run on a general purpose computer system or a dedicated machine), or a combination of both. In one embodiment, the method is performed by the server machine 115 of FIG. 1, while in some other embodiments, some or all of the method might be performed by another machine. It should be noted that blocks depicted in FIG. 3 can be performed simultaneously or in a different order than that depicted.

At block 301, one or more semantic-related values associated with a translation of a first text into a second text are obtained. In one example, the one or more semantic-related values may include one or more of the following:

one or more values based on how faithful (accurate) the meaning of the second text is to the meaning of the first text (e.g., the number of minor semantic errors in the second text, such as interpreting an Apple iPad as a smartphone rather than a tablet computer; the number of major semantic errors in the second text, such as interpreting "Robin" as a bird instead of a person; the total number of semantic errors in the second text, a weighted sum of the number of major and minor semantic errors in the second text, etc.);

one or more values based on extraneous content in the second text (e.g., the number of extraneous nouns or noun phrases in the second text, such as referring to a "software program application" rather than a "software application" or simply "application;" the number of extraneous verb phrases in the second text; the number of extraneous adjective phrases in the second text; etc.);

one or more values based on missing content in the second text (e.g., the number of missing noun phrases in the second text, the number of missing verb phrases in the second text, the number of missing adjective phrases in the second text, etc.); and one or more values based on how closely the cultural context of the second text matches that of the first text (e.g., the number of minor cultural context errors in the second text, the number of major cultural context errors in the second text, the total number of cultural context errors in the second text, a weighted sum of the number of major and minor cultural context errors in the second text, etc.).

It should be noted that in some other examples, the semantic-related values may include other items, such as errors related to language use with respect to a particular domain or social setting of the audience of the translation, errors related inconsistent words or terms, and so forth, in addition to, or instead of, those enumerated above. It should further be noted that in some other examples, errors may be classified into more than two categories, rather than just major and minor, and the values may also include one or more quality ratings (e.g, an integer on a scale from 1 to 10, etc.) for each of the subcategories enumerated above, rather than, or in addition to, the counting of errors. In one embodiment, block 301 is performed by semantic analyzer 202.

At block 302, one or more syntactic-related values associated with the translation are obtained. In one example, the one or more syntactic-related values may include one or more of the following:

one or more values based on grammatical usage (e.g., the number of minor grammatical errors in the second text, the number of major grammatical errors in the second text, the total number of grammatical errors in the second text, a weighted sum of the number of major and minor grammatical errors in the second text, etc.);

one or more values based on spelling (e.g., the number of minor spelling errors in the second text, the number of major spelling errors in the second text, the total number of spelling errors in the second text, a weighted sum of the number of major and minor spelling errors in the second text, etc.);

one or more values based on punctuation (e.g., the number of minor punctuation errors in the second text, the number of major punctuation errors in the second text, the total number of punctuation errors in the second text, a weighted sum of the number of major and minor punctuation errors in the second text, etc.);

one or more values based on usage of plural forms (e.g., the number of minor plural form errors in the second text, the number of major plural form errors in the second text, the total number of plural form errors in the second text, a weighted sum of the number of major and minor plural form errors in the second text, etc.); and one or more values based on non-text items such as equations and tags (e.g., the number of minor errors in tags and equations in the second text, the number of major errors in tags and equations in the second text, the total number of errors in tags and equations in the second text, a weighted sum of the number of major and minor errors in tags and equations in the second text, etc.).

It should be noted that in some other examples, the syntactic-related values may include other items in addition to, or instead of, those enumerated above, and that the errors may be classified into more than two categories, rather than just major and minor (e.g., four categories: trivial, venial, critical, blocker). It should further be noted that in some other examples, the syntactic-related values may also include one or more quality ratings (e.g, an integer on a scale from 1 to 10, etc.) for each of the subcategories enumerated above, rather than, or in addition to, the counting of errors. In one embodiment, block 301 is performed by syntactic analyzer 204.

At block 303, one or more stylistic-related values associated with the translation are obtained. In one example, the one or more stylistic-related values may include one or more of the following:

one or more values based on abbreviation and acronym usage (e.g., the number of minor abbreviation and acronym errors in the second text, the number of major abbreviation and acronym errors in the second text, the total number of abbreviation and acronym errors in the second text, a weighted sum of the number of major and minor abbreviation and acronym errors in the second text, etc.);

one or more values based on capitalization (e.g., the number of minor capitalization errors in the second text, the number of major capitalization errors in the second text, the total number of capitalization errors in the second text, a weighted sum of the number of major and minor capitalization errors in the second text, etc.); and one or more values based on the appropriateness of examples and idioms (e.g., the number of somewhat-inappropriate examples and idioms in the second text, the number of very-inappropriate examples and idioms in the second text, the total number of inappropriate examples and idioms in the second text, a weighted sum of the number of inappropriate examples and idioms in the second text, etc.).

It should be noted that in some other examples, the stylistic-related values may include other items (e.g., unity, readability, dialect and locale correctness, etc.) in addition to, or instead of, those enumerated above. It should further be noted that in some other examples, errors may be classified into more than two categories, rather than just major and minor, and the stylistic values may also include one or more quality ratings (e.g, an integer on a scale from 1 to 10, etc.) for each of the subcategories enumerated above, rather than, or in addition to, the counting of errors. In one embodiment, block 303 is performed by style analyzer 206.

At block 304, one or more formatting-related values associated with the translation are obtained. In one example, the one or more formatting-related values may include one or more of the following:

one or more values based on header and footer usage (e.g., the number of minor header and footer errors in the second text, the number of major header and footer errors in the second text, the total number of header and footer errors in the second text, a weighted sum of the number of major and minor header and footer errors in the second text, etc.);

one or more values based on numbers and cross-references (e.g., the number of minor number/cross-reference errors in the second text, the number of major number/cross-reference errors in the second text, the total number of number/cross-reference errors in the second text, a weighted sum of the number of major and minor number/cross-reference errors in the second text, etc.); and one or more values based on font usage (e.g., the number of minor font usage errors in the second text, the number of major font usage errors in the second text, the total number of font usage errors in the second text, a weighted sum of the number of major and minor font usage errors in the second text, etc.); and one or more values based on white space usage (e.g., the number of minor white space usage errors in the second text, the number of major white space usage errors in the second text, the total number of white space usage errors in the second text, a weighted sum of the number of major and minor white space usage errors in the second text, etc.).

It should be noted that in some other examples, the formatting-related values may include other items (e.g., maximum string length, indentation, etc.) in addition to, or instead of, those enumerated above. It should further be noted that in some other examples, errors may be classified into more than two categories, rather than just major and minor, and the stylistic values may also include one or more quality ratings (e.g, an integer on a scale from 1 to 10, etc.) for each of the subcategories enumerated above, rather than, or in addition to, the counting of errors. In one embodiment, block 304 is performed by formatting analyzer 208.

At block 305, an overall translation quality score is obtained based on the semantic-related value(s) obtained at block 301, the syntactic-related value(s) obtained at block 302, the stylistic-related value(s) obtained at block 303, and the formatting-related value(s) obtained at block 304. In one example, the overall translation quality score is obtained by calculating a normalized score for each of the four categories, and then computing a weighted sum of the four normalized scores (e.g., weighing semantic quality more highly than formatting quality, etc.). In one embodiment, block 305 is performed by translation quality evaluator 210.

Figure 4:
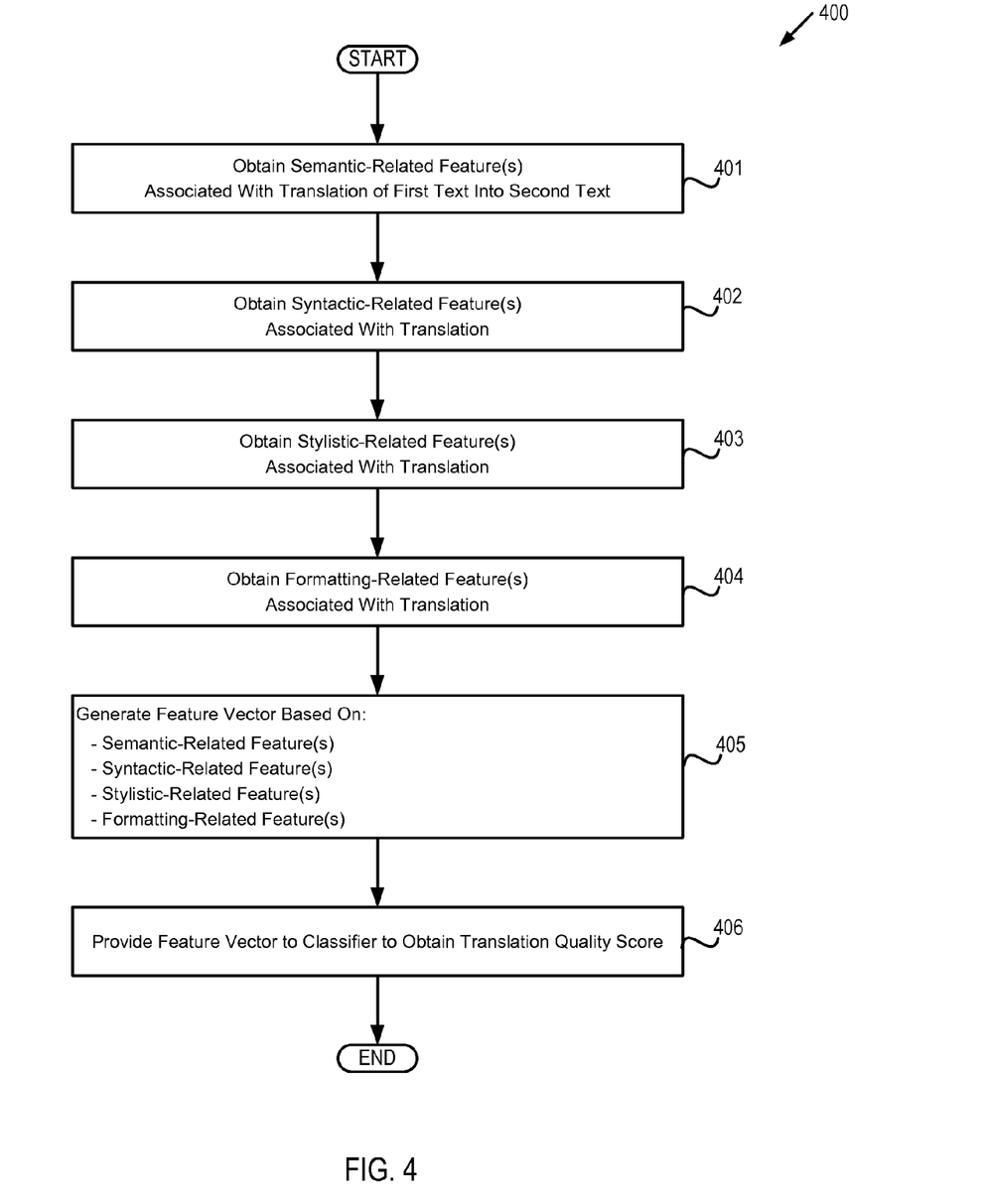
FIG. 4 depicts a flow diagram of one embodiment of a second method for evaluating the quality of a translation from a first text in a first natural language to a second text in a second natural language.

FIG. 4 depicts a flow diagram of one embodiment of a second method 400 for evaluating the quality of a translation from a first text in a first natural language to a second text in a second natural language. The method is performed by processing logic that may comprise hardware (circuitry, dedicated logic, etc.), software (such as is run on a general purpose computer system or a dedicated machine), or a combination of both. In one embodiment, the method is performed by the server machine 115 of FIG. 1, while in some other embodiments, some or all of the method might be performed by another machine. It should be noted that blocks depicted in FIG. 4 can be performed simultaneously or in a different order than that depicted.

At block 401, one or more semantic-related features associated with a translation from a first text to a second text are obtained. In one embodiment, the features may include the presence and frequency of various semantic entities (e.g., people, places, activities, etc.) in the first text and the second text, the presence and frequency of various semantic relationships between entities (e.g., marriage, partnership, semantic actor/actee, etc.) in the first text and the second text, a cultural context identifier associated with the first text and with the second text, and so forth. In some examples, the semantic entities may be identified by one or more linguistic analysis programs (e.g., a parser to identify noun phrases, a semantic interpreter to map noun phrases and verb phrases to semantic entities, etc.), while in some other examples the semantic entities may be identified by a classifier (e.g., a classifier that has been trained on input-output pairs mapping a semantic feature vector associated with text to a set of semantic entities, etc.), while in yet other examples the semantic-related features may be determined by a user. In one embodiment, block 401 is performed by semantic analyzer 202.

At block 402, one or more syntactic-related features associated with a translation from a first text to a second text are obtained. In one embodiment, the features may include the presence and frequency of various syntactic entities (e.g., particular noun phrases, particular verb phrases, particular adjective phrases, etc.) in the first text and the second text, syntactic relationships between entities (e.g., subject/object, etc.) in the first text and the second text, and so forth. In some examples, the syntactic entities may be identified by one or more linguistic analysis programs (e.g., a parser to identify parts of speech, etc.), while in some other examples the syntactic entities may be identified by a classifier (e.g., a classifier that has been trained on input-output pairs mapping a syntactic feature vector associated with text to a set of syntactic entities, etc.), while in yet other examples the syntactic-related features may be determined by a user. In one embodiment, block 302 is performed by syntactic analyzer 204.

At block 403, one or more stylistic-related features associated with a translation from a first text to a second text are obtained. In one embodiment, the features may include the presence and frequency of various stylistic-related entities (e.g., particular abbreviations, particular acronyms, particular idioms, etc.) in the first text and the second text, etc. In some examples, the stylistic entities may be identified by one or more linguistic analysis programs (e.g., a parser, etc.), while in some other examples the stylistic entities may be identified by a classifier (e.g., a classifier that has been trained on input-output pairs mapping a stylistic feature vector associated with text to a set of stylistic entities, etc.), while in yet other examples the stylistic-related features may be determined by a user. In one embodiment, block 403 is performed by style analyzer 206.

At block 404, one or more formatting-related features associated with a translation from a first text to a second text are obtained. In one embodiment, the features may include the presence, positioning, type, and size of various formatting-related entities (e.g., headers and footers, fonts, white space, etc.) in the first text and the second text, etc. In some examples, the formatting entities may be identified by one or more text layout or formatting programs (e.g., a desktop publishing application, a layout editor, an image-processing application, a word processor, etc.), while in some other examples the formatting entities may be identified by a classifier (e.g., a classifier that has been trained on input-output pairs mapping a formatting feature vector associated with text to a set of formatting entities, etc.), while in yet other examples the formatting-related features may be determined by a user. In one embodiment, block 404 is performed by formatting analyzer 208.

At block 405, a feature vector is generated based on the semantic-related feature(s) obtained at block 401, the syntactic-related feature(s) obtained at block 402, the stylistic-related feature(s) obtained at block 403, and the formatting-related feature(s) obtained at block 404. In some examples, the feature vector may simply be a collection of the features obtained at blocks 401 through 404, while in some other examples, additional processing may be applied to the features (e.g., a weighted sum, a normalized average, some other combining function or mechanism, etc.) in the generation of the feature vector. In one embodiment, block 405 is performed by translation quality evaluator 210.

At block 406, the feature vector generated at block 405 is provided to a classifier to obtain an overall translation quality score. In one embodiment, the classifier has previously been trained on a set of examples, each of which is an input-output pair, where the input comprises a feature vector based on an original text and a translation of the original text, and the output comprises a subjective translation quality score that is provided by a user. In one embodiment, block 406 is performed by translation quality evaluator 210.

Figure 5:
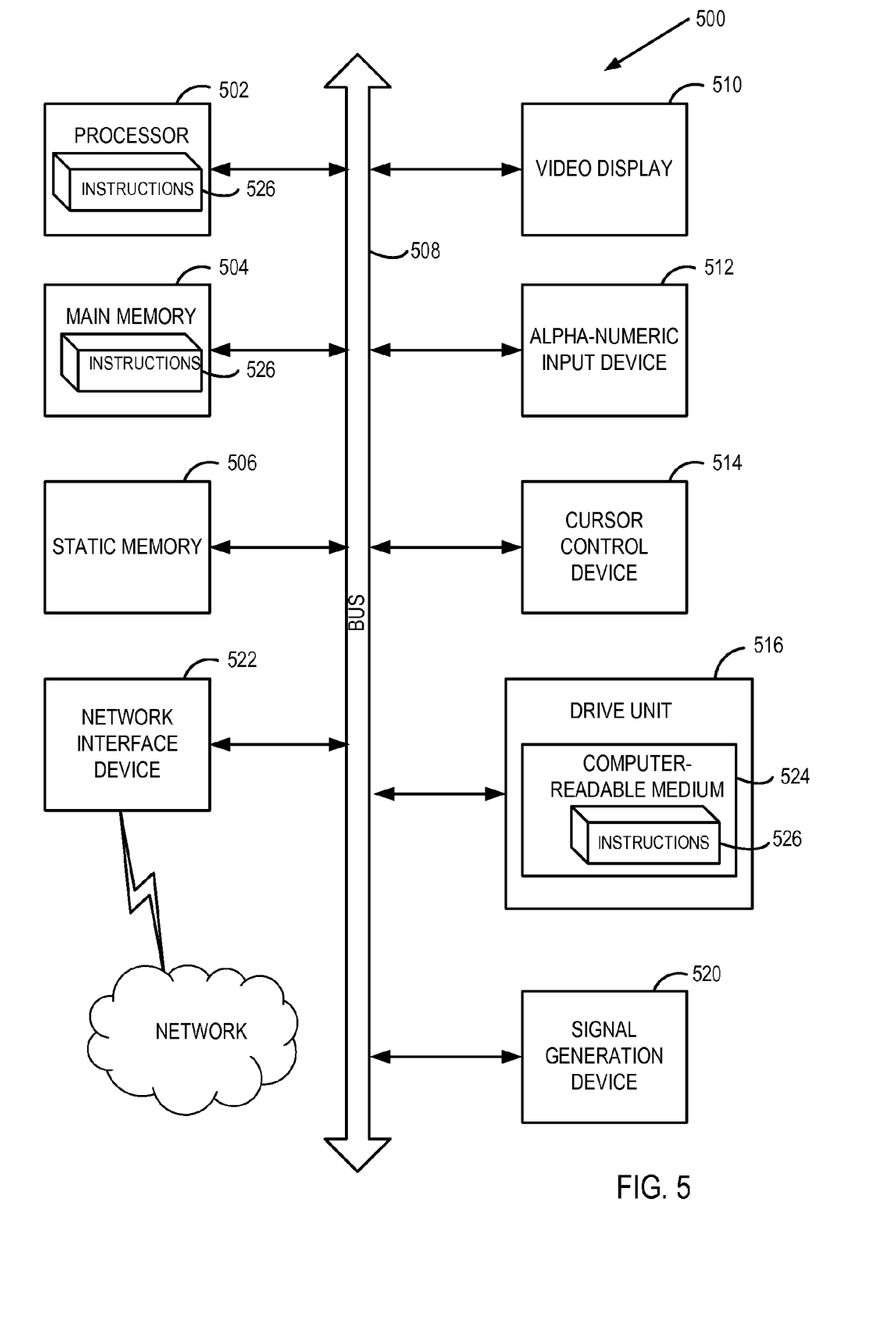
FIG. 5 depicts a block diagram of an illustrative computer system operating in accordance with embodiments of the invention.

FIG. 5 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 through 5, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "determining", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   identifying a first computer-generated translation from a first text in a first natural language to a second text in a second natural language;
   identifying a user-provided subjective translation quality score for the first computer-generated translation;
   determining, by a processor, a first set of semantic features of the first text,
   and a second set of semantic features of the second text;
   determining, by the processor, a first value that is based on one or more errors of plural form usage of the first text;

determining, by the processor, a second value that is based on one or more errors of plural form usage of the second text;

training, by the processor, a classifier with a set of input-output mappings, wherein a first input-output mapping of the set of input-output mappings comprises an input that is based on the first value, the second value, the first set of semantic features, and the second set of semantic features, and wherein the first input-output mapping comprises an output that is based on the first user-provided subjective translation quality score;

identifying a second computer-generated translation from a third text in the first natural language to a fourth text in the second natural language;

determining, by the processor, a third set of semantic features of the third text, and a fourth set of semantic features of the fourth text;

determining, by the processor, a third value that is based on one or more errors of plural form usage of the third text;

determining, by the processor, a fourth value that is based on one or more errors of plural form usage of the fourth text;

providing, to the classifier, one or more inputs that are based on the third value, the fourth value, the third set of semantic features, and the fourth set of semantic features;

running, by the processor, the classifier with the one or more inputs to obtain a computer-generated subjective translation quality score for the second computer-generated translation; and providing to a client device, by the processor, an assessment of the second computer-generated translation based on the computer-generated subjective translation quality score.

2. The method of claim 1 wherein the first set of semantic features of the first text comprises a frequency of a semantic entity.

3. The method of claim 1 wherein the first input-output mapping comprises a fifth value that is based on one or more punctuation errors of the second text.

4. The method of claim 1 wherein the first input-output mapping comprises a fifth value that is based on one or more cultural context errors of the second text.

5. An apparatus comprising:
a memory to store:
a first text in a first natural language,
a second text that is a computer-generated translation of the first text into a second natural language,
a third text in the first natural language, and
a fourth text that is a computer-generated translation of the third text into the second natural language; and
a processor, operatively coupled to the memory, to:
identify a user-provided subjective translation quality score for the first computer-generated translation;
determine a first set of semantic features of the first text;
determine a second set of semantic features of the second text;
determine a first value that is based on one or more errors of plural form usage of the first text;
determine a second value that is based on one or more errors of plural form usage of the second text;
train a classifier with a set of input-output mappings, wherein a first input-output mapping of the set of input-output mappings comprises an input that is based on the first value, the second value, the first set of semantic features, and the second set of semantic features, and wherein the first input-output mapping comprises an output that is based on the first user-provided subjective translation quality score;
identify a second computer-generated translation from a third text in the first natural language to a fourth text in the second natural language;
determine a third set of semantic features of the third text;
determine a fourth set of semantic features of the fourth text;
determine a third value that is based on one or more errors of plural form usage of the third text;
determine a fourth value that is based on one or more errors of plural form usage of the fourth text;
provide, to the classifier, one or more inputs that are based on the third value, the fourth value, the third set of semantic features, and the fourth set of semantic features;
run the classifier with the one or more inputs to obtain a computer-generated subjective translation quality score for the second computer-generated translation; and
provide to a client device an assessment of the second computer-generated translation based on the computer-generated subjective translation quality score.

6. The apparatus of claim 5 wherein the first set of semantic features of the first text comprises a frequency of a semantic entity.

7. The apparatus of claim 5 wherein the first input-output mapping comprises a fifth value that is based on one or more capitalization errors of the second text.

8. The apparatus of claim 5 wherein the first input-output mapping comprises a fifth value that is based on one or more terminology errors of the second text.

9. A non-transitory computer readable storage medium, having instructions stored therein, which when executed, cause a processor to:
identify a first computer-generated translation from a first text in a first natural language to a second text in a second natural language;
identify a user-provided subjective translation quality score for the first computer-generated translation;
determine, by the processor, a first set of semantic features of the first text;
determine, by the processor, a second set of semantic features of the second text;
determine a first value that is based on one or more errors of plural form usage of the first text;
determine a second value that is based on one or more errors of plural form usage of the second text;
train, by the processor, a classifier with a set of input-output mappings, wherein a first input-output mapping of the set of input-output mappings comprises an input that is based on the first value, the second value, the first set of semantic features, and the second set of semantic features, and wherein the first input-output mapping comprises an output that is based on the first user-provided subjective translation quality score;
identify a second computer-generated translation from a third text in the first natural language to a fourth text in the second natural language;

determine, by the processor, a third set of semantic features of the third text;
determine, by the processor, a fourth set of semantic features of the fourth text;
determine, by the processor, a third value that is based on one or more errors of plural form usage of the third text;
determine, by the processor, a fourth value that is based on one or more errors of plural form usage of the fourth text;
provide, to the classifier, one or more inputs that are based on the third value, the fourth value, the third set of semantic features, and the fourth set of semantic features;
run, by the processor, the classifier with the one or more inputs to obtain a computer-generated subjective translation quality score for the second computer-generated translation; and
provide, to a client device, an assessment of the second computer-generated translation based on the computer-generated subjective translation quality score.

10. The non-transitory computer readable storage medium of claim 9 wherein the first set of semantic features of the first text comprises a frequency of a semantic entity.

11. The non-transitory computer readable storage medium of claim 9 wherein the first input-output mapping comprises a fifth value that is based on one or more locale-specific context errors of the second text.

* * * * *